United States Patent
Minamisawa

(10) Patent No.: US 11,442,287 B2
(45) Date of Patent: Sep. 13, 2022

(54) OPTICAL UNIT

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 471 days.

(21) Appl. No.: 16/696,330

(22) Filed: Nov. 26, 2019

(65) Prior Publication Data
US 2020/0174273 A1 Jun. 4, 2020

(30) Foreign Application Priority Data

Nov. 30, 2018 (JP) .............................. JP2018-224949
Mar. 28, 2019 (JP) .............................. JP2019-063463

(51) Int. Cl.
| | | |
|---|---|---|
| H04N 5/232 | (2006.01) | |
| G02B 27/64 | (2006.01) | |
| H02K 41/035 | (2006.01) | |
| G03B 5/02 | (2021.01) | |
| H04N 5/225 | (2006.01) | |
| H04M 1/02 | (2006.01) | |

(52) U.S. Cl.
CPC .............. *G02B 27/646* (2013.01); *G03B 5/02* (2013.01); *H02K 41/0356* (2013.01); *H04N 5/2254* (2013.01); *H04N 5/2328* (2013.01); G03B 2205/0069 (2013.01); H02K 2201/18 (2013.01); H04M 1/0264 (2013.01)

(58) Field of Classification Search
CPC ............... H04N 5/2254; H04N 5/2328; H04N 5/23287; G03B 5/02; G03B 5/06; G03B 17/02; G03B 2205/0023; G03B 2205/0053; G03B 2205/0069; H02K 41/0356; H02K 2201/18; G02B 7/02; G02B 27/646; H04M 1/0264
See application file for complete search history.

(56) References Cited

U.S. PATENT DOCUMENTS

| | | | |
|---|---|---|---|
| 9,891,444 B2* | 2/2018 | Minamisawa | H04N 5/23287 |
| 2016/0124242 A1* | 5/2016 | Minamisawa | H04N 5/232 |
| | | | 359/557 |
| 2017/0374247 A1* | 12/2017 | Minamisawa | H04N 5/2252 |

FOREIGN PATENT DOCUMENTS

| | | |
|---|---|---|
| JP | 2011069915 A | 4/2011 |
| WO | 2012015010 A1 | 2/2012 |

* cited by examiner

*Primary Examiner* — Lin Ye
*Assistant Examiner* — Chriss S Yoder, III
(74) *Attorney, Agent, or Firm* — Cantor Colburn LLP

(57) ABSTRACT

An optical unit may include a movable body having an optical module, a fixed body, a support mechanism structured to swingably support the movable body, and a magnetic drive part which is provided on at least two faces of the movable body and the fixed body and is structured to swing the movable body. All faces of one of the movable body and the fixed body may be formed with a protruded part protruded to a direction where the movable body and the fixed body are faced each other, all faces of the other of the movable body and the fixed body may be formed with a contact part capable of contacting with the protruded part, and the face of the one of the movable body and the fixed body where the magnetic drive part is provided is formed with the protruded part on both sides of the magnetic drive part.

7 Claims, 11 Drawing Sheets

OPTICAL UNIT

CROSS REFERENCE TO RELATED APPLICATION

The present application claims priority under 35 USC 119 to Japanese Application No. 2018-224949 filed on Nov. 30, 2018 and Japanese Application No. 2019-063463 filed on Mar. 28, 2019, the entire disclosures of both of which are incorporated herein reference.

TECHNICAL FIELD

The present invention relates to an optical unit.

BACKGROUND

Conventionally, various optical units have been used each of which includes a movable body, a fixed body, a support mechanism movably supporting the movable body with respect to the fixed body, and a magnetic drive part structured to swing the movable body with respect to the fixed body. For example, in WO2012/015010 (Patent Literature 1), an optical unit is disclosed which includes an inner frame as a movable body, an outer frame as a fixed body, coil springs as a support mechanism, and coils and magnets as a magnetic drive part.

When a movable range of the movable body with respect to the fixed body is excessively large, structure members of the magnetic drive part such as a coil and a magnet may collide with each other to be damaged. Therefore, there may be a case that a movable range of the movable body with respect to the fixed body is required to be restricted. However, in a conventional optical unit including a movable body, a fixed body, a support mechanism and a magnetic drive part like an optical unit described in Patent Literature 1, it is difficult that a movable range of the movable body with respect to the fixed body is restricted while reducing a size of the optical unit.

SUMMARY

In view of the problem described above, at least an embodiment of the present invention provides an optical unit capable of restricting a movable range of the movable body with respect to the fixed body without increasing the size of the optical unit.

To solve the above mentioned problem, at least an embodiment of the present invention provides an optical unit including a movable body having an optical module, a fixed body, a support mechanism structured to swingably support the movable body with respect to the fixed body, and a magnetic drive part which is provided on at least two faces of the movable body and the fixed body facing in a direction intersecting an optical axis direction and is structured to swing the movable body with respect to the fixed body. All faces of one of the movable body and the fixed body in the direction intersecting the optical axis direction are formed with a protruded part which is protruded to a direction where the movable body and the fixed body are faced each other, all faces of the other of the movable body and the fixed body in the direction intersecting the optical axis direction are formed with a contact part which is capable of contacting with the protruded part, and the face of the one of the movable body and the fixed body where the magnetic drive part is provided is formed with the protruded part on both sides of the magnetic drive part.

According to this embodiment, all faces in the direction intersecting the optical axis direction are formed with a protruded part which is protruded to a direction where the movable body and the fixed body are faced each other, and the face where the magnetic drive part is provided is formed with the protruded part on both sides of the magnetic drive part. Therefore, the protruded part can be disposed efficiently, and a movable range of the movable body with respect to the fixed body can be restricted without increasing the size of the optical unit.

In the optical unit in accordance with at least an embodiment of the present invention, it is preferable that a face of the one of the movable body and the fixed body where the magnetic drive part is not provided is formed with the protruded part which is extended in a direction intersecting the optical axis direction. When a protruded part extended in a direction intersecting the optical axis direction is provided, the rigidity can be increased.

In the optical unit in accordance with at least an embodiment of the present invention, it is preferable that the protruded part is formed in the movable body. When the protruded part is formed in the movable body, a contact position of the protruded part with the contact part can be restrained from being deviated, and a space between the protruded part and the contact part for securing a desired movable range of the movable body can be minimized.

In the optical unit in accordance with at least an embodiment of the present invention, it is preferable that the support mechanism swingably supports the movable body with respect to the fixed body with a swing axis in a direction intersecting the optical axis direction as a reference, and the protruded part is provided with an opposing face in a flat face shape which is disposed in a direction facing the contact part at a position including the swing axis in the optical axis direction. Since the opposing face in a flat face shape is disposed at a position including the swing axis in the optical axis direction, a space between the protruded part and the contact part for securing a desired movable range of the movable body can be minimized.

In the optical unit in accordance with at least an embodiment of the present invention, it is preferable that a length in the optical axis direction of the opposing face is set to be a length which does not exceed a position of the swing axis in the optical axis direction when the protruded part and the contact part are contacted with each other. Even in a case that the movable body is moved to the maximum with respect to the fixed body, a movable range of the movable body with respect to the fixed body can be restricted.

In the optical unit in accordance with at least an embodiment of the present invention, it is preferable that the support mechanism swingably supports the movable body with respect to the fixed body with a swing axis in a direction intersecting the optical axis direction as a reference, and the protruded part is provided with a circular arc face with the swing axis as a center. Since the protruded part is provided with a circular arc face with the swing axis as a center, a movable range of the movable body can be restricted regardless of a swing angle.

In the optical unit in accordance with at least an embodiment of the present invention, it is preferable that the protruded part is provided with a tapered part whose length in the optical axis direction is gradually reduced toward the direction in which the movable body and the fixed body are faced each other. When the protruded part is formed in a shape having a tapered part, the rigidity can be increased.

According to the optical unit in at least an embodiment of the present invention, a movable range of the movable body with respect to the fixed body can be restricted without increasing the size of the optical unit.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
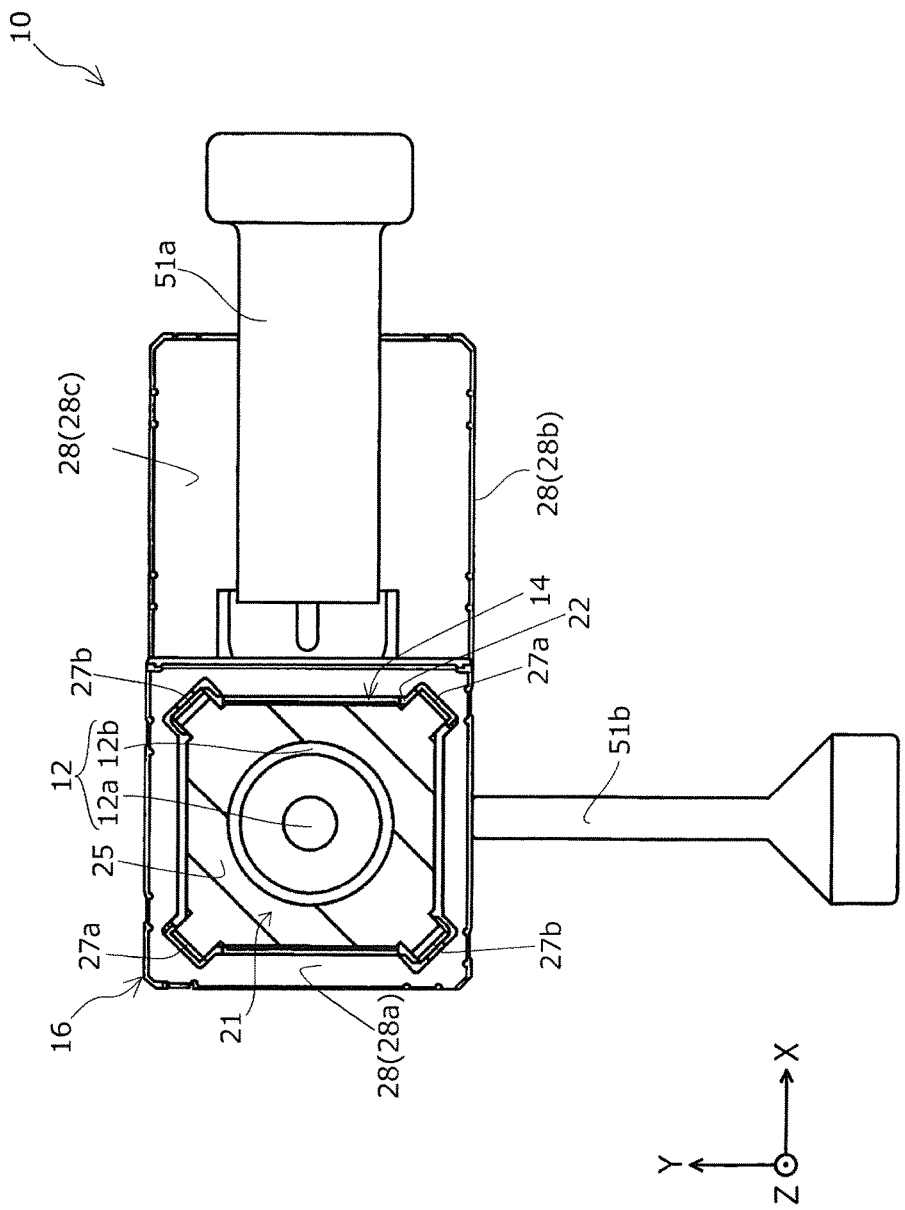
FIG. 1 is a plan view showing an optical unit in accordance with a first embodiment of the present invention.

Embodiments of the present invention will be described below with reference to the attached drawings. The same reference signs are used in the same structures in each of the embodiments, and the same structures are described only in a first embodiment and descriptions of the same structures are omitted in the subsequent embodiments.

First Embodiment (FIG. 1 Through FIG. 8)

First, an optical unit in accordance with a first embodiment of the present invention will be described below with reference to FIG. 1 through FIG. 8. In FIG. 2, the alternate long and short dash line with the reference sign "L" indicates an optical axis, the alternate long and short dash line with the reference sign "L1" indicates a first axial line intersecting the optical axis, and the alternate long and short dash line with the reference sign "L2" indicates a second axial line "L2" intersecting the optical axis "L" and the first axial line "L1". Further, in the respective figures, the "Z"-axis direction is an optical axis direction, the "X"-axis direction is a direction intersecting the optical axis, i.e., an axial direction of yawing, and the "Y"-axis direction is a direction intersecting the optical axis, i.e., an axial direction of pitching.

<Schematic Entire Structure of Optical Unit>

A structure of an optical unit 10 in accordance with an embodiment of the present invention will be described below with reference to FIG. 1 through FIG. 3. The optical unit 10 includes a movable body 14 having an optical module 12, and a fixed body 16 which holds the movable body 14 in a state that the movable body 14 is capable of being displaced in a direction with the "Y"-axis direction as a turning axis (pitching direction) and in a direction with the "X"-axis direction as a turning axis (yawing direction). Further, the optical unit 10 includes a turning drive mechanism 18 structured to drive the movable body 14 in the pitching direction and the yawing direction and a support mechanism 20 (thrust receiving member) which supports the movable body 14 turnable in the pitching direction and the yawing direction with respect to the fixed body 16. In addition, the optical unit 10 includes a gimbal mechanism 21 having a gimbal frame part 25. The gimbal frame part 25 is provided with first support part extended parts 27a extended from both end parts in the first axial line "L1" along the optical axis direction and second support part extended parts 27b extended from both end parts in the second axial line "L2" along the optical axis direction.

<Optical Module>

In this embodiment, the optical module 12 is formed in a substantially rectangular case shape and, for example, the optical module 12 is used as a thin camera mounted on a cellular phone with a camera, a tablet type PC and the like. The optical module 12 includes a lens 12a on an object side and incorporates an optical device structured to capture an image in an inside of a rectangular case-shaped housing 12b. The optical unit 10 in this embodiment incorporates, as an example, an actuator structured to correct a shake of pitching (shake in a turning direction with the "Y"-axis direction as a turning axis) occurred in the optical module 12 and a shake of yawing (shake in a turning direction with the "X"-axis direction as a turning axis), and the optical unit 10 is structured so as to be capable of performing a shake correction of pitching and a shake correction of yawing.

In this embodiment, the optical unit 10 is structured so as to be capable of correcting a shake of pitching and a shake of yawing. However, the present invention is not limited to this structure and, for example, a structure may be adopted that only one of a shake of pitching and a shake of yawing can be corrected.

<Imaging Element>

Figure 3:
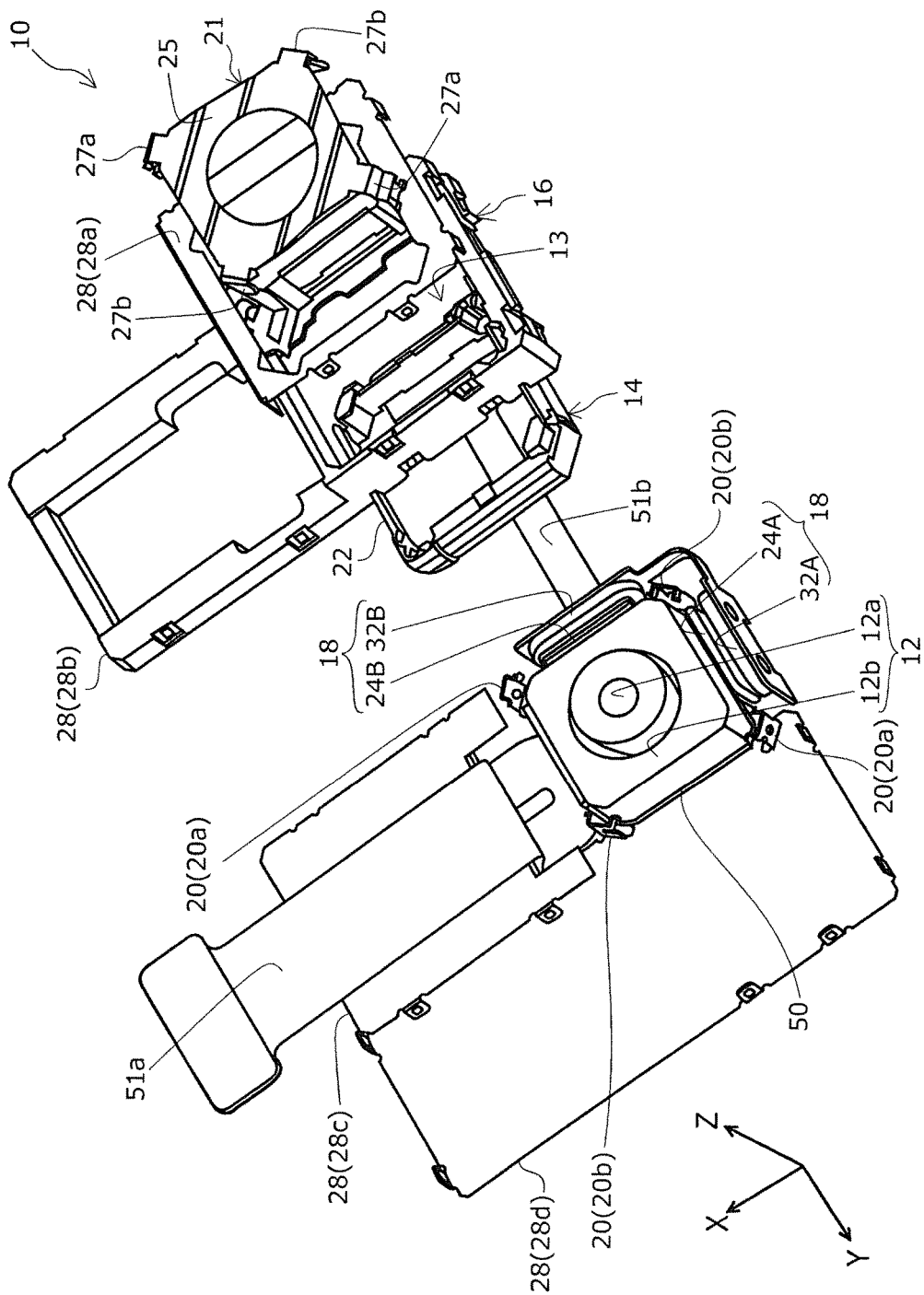
FIG. 3 is an exploded perspective view showing an optical unit in accordance with a first embodiment of the present invention.

As shown in FIG. 3, the optical module 12 includes an imaging element 50 on an opposite side to an object side. The imaging element 50 is connected with a first flexible circuit board 51a. The imaging element 50 in this embodiment is provided with a connection part not shown and the connection part is connected with the first flexible circuit board 51a.

<Movable Body>

Figure 2:
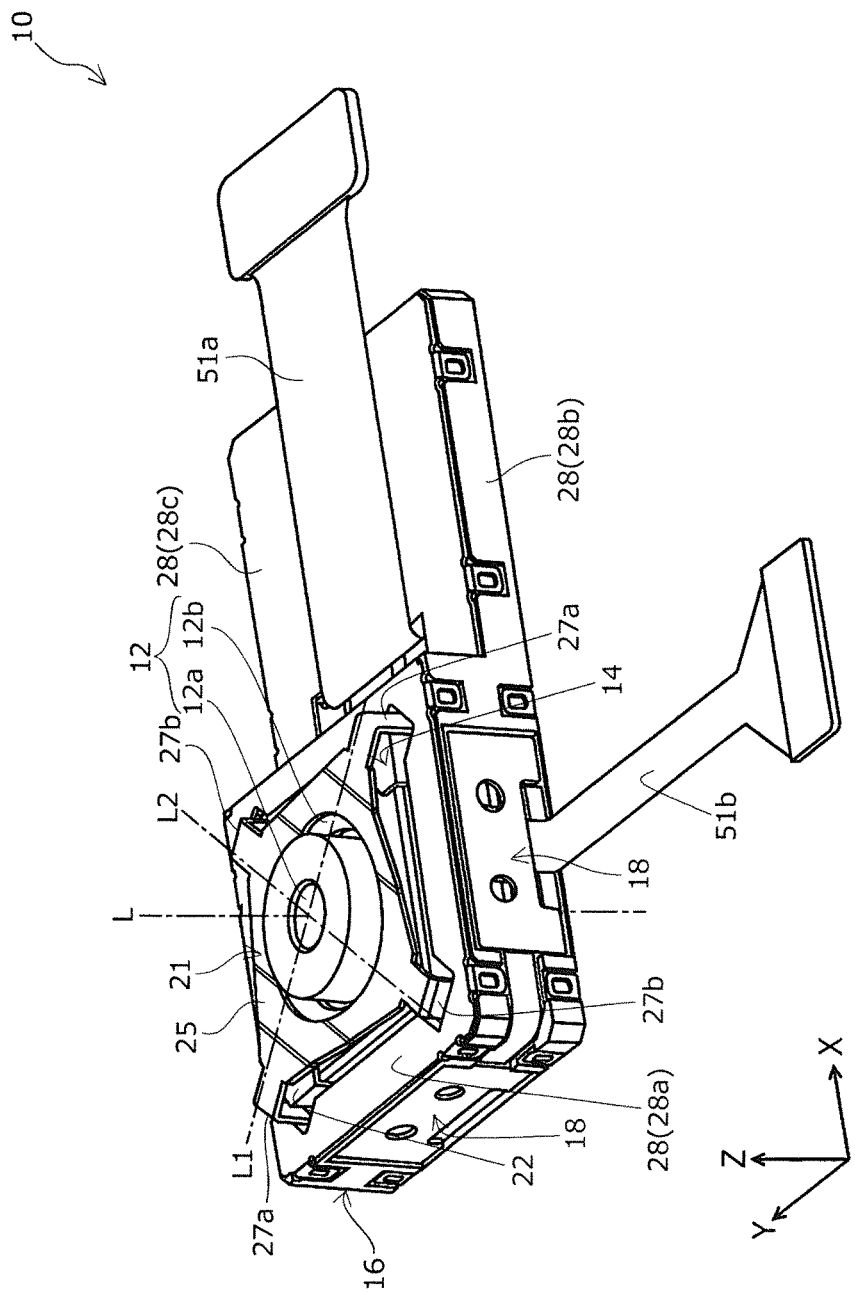
FIG. 2 is a perspective view showing an optical unit in accordance with a first embodiment of the present invention.

In FIG. 1 through FIG. 3, the movable body 14 includes the optical module 12, a holder frame 22 and magnets 24A and 24B. The holder frame 22 is structured to be a member in a rectangular frame shape which surrounds four side faces of the optical module 12 except its front face (face on an object side) where the lens 12a of the optical module 12 is provided and its rear face on an opposite side. The holder frame 22 in this embodiment is, as an example, structured so that the optical module 12 is detachable. The magnets 24A and 24B for correcting pitching and yawing are attached to outer faces of the holder frame 22 by utilizing two faces facing the fixed body 16. In FIG. 3, in order to easily understood the provided positions of the magnets 24A and 24B, the magnets 24A and 24B are shown in a separated state from the holder frame 22, but the magnets 24A and 24B are attached to the holder frame 22. A detailed shape of the movable body 14 will be described below together with an arrangement of the movable body 14 with respect to the fixed body 16.

<Fixed Body>

In FIG. 1 through FIG. 3, the fixed body 16 includes a fixed frame 28 and coils 32A and 32B. In this embodiment, the fixed frame 28 is structured of a first front face cover part 28a surrounding the movable body 14 on the object side, a side face cover part 28b surrounding four faces of the holder frame 22, a second front face cover part 28c which is provided on the object side and on which the first flexible circuit board 51a is placed, and a rear face cover part 28d which covers an opposite side to the object side. In FIG. 3, in order to easily understood the positions of the coils 32A and 32B with respect to the magnets 24A and 24B, the coils 32A and 32B are shown in a separated state from the side face cover part 28b, but the coils 32A and 32B are attached to the side face cover part 28b.

As shown in FIG. 3, in this embodiment, the magnet 24A and the coil 32A are set in a facing state and the magnet 24B and the coil 32B are set in a facing state in a state that the movable body 14 is disposed in an inside of the fixed body 16. Further, in this embodiment, a pair of the magnet 24A and the coil 32A and a pair of the magnet 24B and the coil 32B structure a turning drive mechanism 18. In other words, the turning drive mechanism 18 is provided on at least two faces of the movable body 14 and the fixed body 16 facing each other so as to intersect the optical axis direction and serves as a magnetic drive part which swings the movable body 14 with respect to the fixed body 16. Pitching and yawing of the movable body 14 are corrected by the turning drive mechanism 18. In this embodiment, the coil 32A and coil 32B are, as an example, structured of a sheet-shaped coil. An air core part of a sheet-shaped coil is narrower than that of a winding coil and thus, it may be difficult to form a large member at a position corresponding to the air core part.

Corrections of pitching and yawing are performed as follows. When a shake of both or either one of a pitching direction and a yawing direction occurs in the optical unit 10, the shake is detected by a shake detection sensor (gyroscope) not shown and the turning drive mechanism 18 is driven based on the result. After that, the turning drive mechanism 18 is operated so as to correct the shake of the optical unit 10 by using a magnetic sensor (Hall element) or the like not shown with a high degree of accuracy. In other words, an electric current is supplied to the respective coils 32A and 32B so as to move the movable body 14 in a direction canceling the shake of the optical unit 10 and thereby the shake is corrected.

The optical unit 10 in this embodiment includes the turning drive mechanism 18 structured to turn the movable body 14 with respect to the fixed body 16 with the first axial line "L1" and the second axial line "L2" as turning axes. The movable body 14 is turned around the axial direction of pitching and the axial direction of yawing by combination of turnings around the first axial line "L1" and the second axial line "L2". The turning drive mechanism 18 is preferably disposed at a position other than a side where the first flexible circuit board 51a is disposed in the "X"-axis direction with respect to the movable body 14 like this embodiment. Since the turning drive mechanism 18 can be disposed on a side where the first flexible circuit board Ma is not provided, contact between the turning drive mechanism 18 and the second flexible circuit board 51b connected with the turning drive mechanism 18 and the first flexible circuit board 51a can be restrained. Therefore, according to this structure, the size of the optical unit 10 is not required to increase and the size of the optical unit 10 can be reduced. The "turning" in the present specification is not required to turn 360° and includes a swing in a turning direction.

<Gimbal Mechanism>

The gimbal mechanism 21 is a mechanism having a spring property formed by bending a flat plate material made of metal. Specifically, as shown in FIG. 3, the gimbal mechanism 21 in this embodiment is provided with a gimbal frame part 25, and the gimbal frame part 25 is structured so as to provide with two first support part extended parts 27a and two second support part extended parts 27b which are formed by bending four corner parts of the gimbal frame part 25 by 90° to an opposite side to the object side in the optical axis direction. In this case, the entire first support part extended part 27a and the entire second support part extended part 27b are not required to be formed in a plate shape, and only their parts may be formed in a plate shape for obtaining a spring property. The gimbal mechanism 21 in this embodiment is structured as described above and thus, pressurization is capable of applying toward an outer side direction.

<Support Mechanism>

The support mechanism 20 shown in FIG. 3 turnably supports the movable body 14 with respect to the fixed body 16 with the first axial line "L1" and the second axial line "L2" as turning axes. As shown in FIG. 3, the support mechanism 20 includes two first thrust receiving members 20a each of which supports the first support part extended part 27a and two second thrust receiving members 20b each of which supports the second support part extended part 27b. The first thrust receiving member 20a is disposed at two facing positions of four corners of a rectangular frame-shaped portion in the side face cover part 28b (frame wall) of the fixed body 16, and the second thrust receiving member 20b is disposed at two facing positions of four corners of the movable body 14 in a rectangular frame shape. In other words, the first thrust receiving members 20a are fixed to the fixed body 16 and the second thrust receiving members 20b are fixed to the movable body 14. In this embodiment, the rectangular frame-shaped portion of the side face cover part 28b and the movable body 14 in a rectangular frame shape are disposed so that the positions of their four corners are aligned to each other, and the first thrust receiving member 20a and the second thrust receiving member 20b are disposed in four corners one by one.

In this embodiment, the first support part extended part 27a is provided with a spherical recessed surface and the first thrust receiving member 20a is provided with a spherical projecting surface and the spherical recessed surface and the spherical projecting surface are abutted with each other and thereby the first support part extended part 27a is supported by the first thrust receiving member 20a. Similarly, the second support part extended part 27b is provided with a spherical recessed surface and the second thrust receiving member 20b is provided with a spherical projecting surface and the spherical recessed surface and the spherical projecting surface are abutted with each other and thereby the second support part extended part 27b is supported by the second thrust receiving member 20b. Each of the two first support part extended parts 27a and each of the two second support part extended parts 27b are structured to apply pressurization to an outer side direction. Therefore, each of the spherical recessed surfaces presses each of the corresponding spherical projecting surfaces through the pressurization, and the first support part extended parts 27a and the second support part extended parts 27b are respectively supported by the corresponding first thrust receiving member 20a and the corresponding second thrust receiving member 20b.

<Arrangement of Movable Body to Fixed Body>

Next, a detailed shape of the movable body 14 which is a main part of the optical unit 10 in this embodiment will be described in detail below from a viewpoint of arrangement to the fixed body 16 with reference to FIG. 4 through FIG. 8 and FIG. 11.

Figure 4:
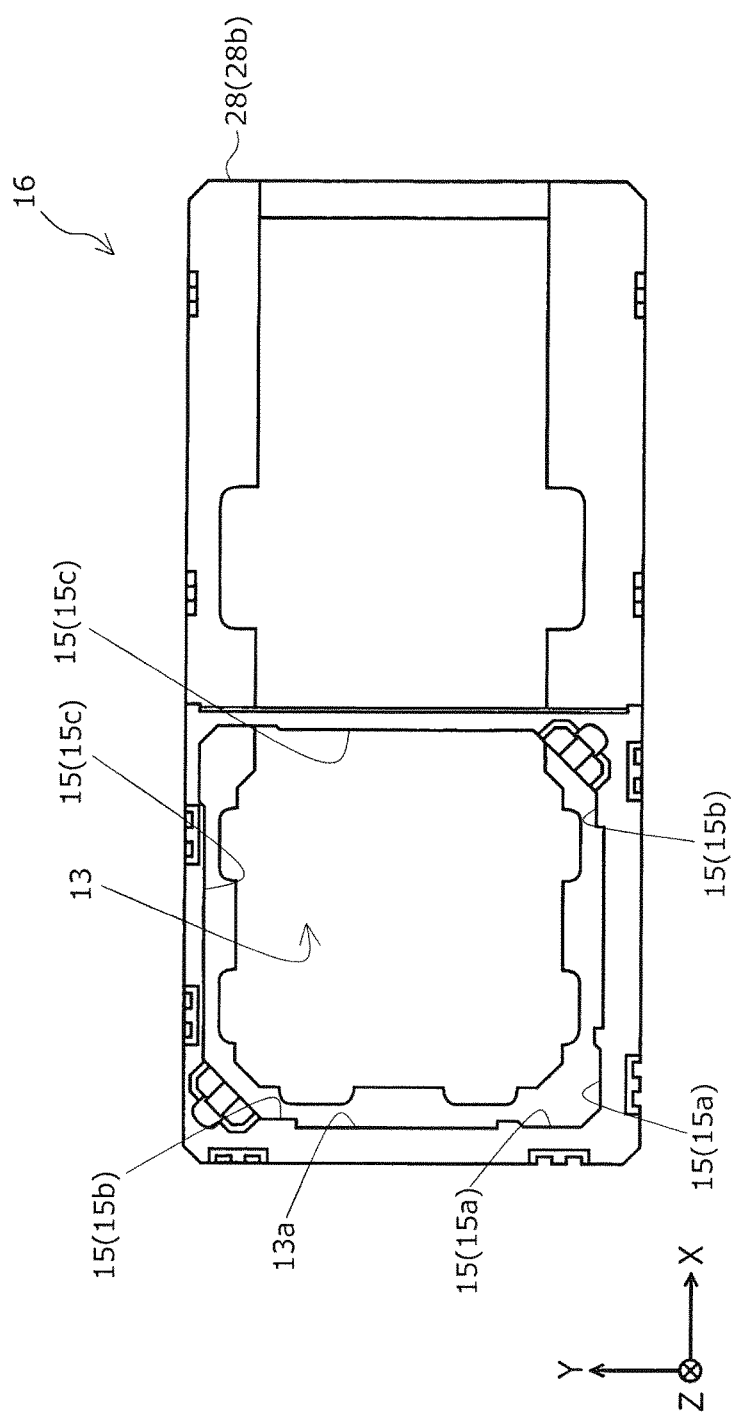
FIG. 4 is a plan view showing a fixed body of an optical unit in accordance with a first embodiment of the present invention.
Figure 5:
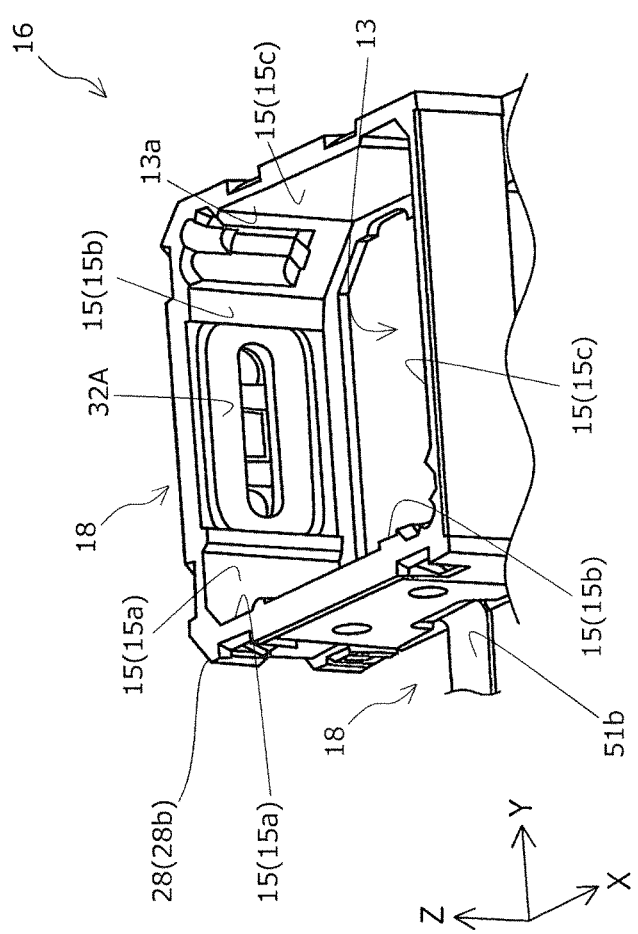
FIG. 5 is a perspective view showing a fixed body of an optical unit in accordance with a first embodiment of the present invention.
Figure 6:
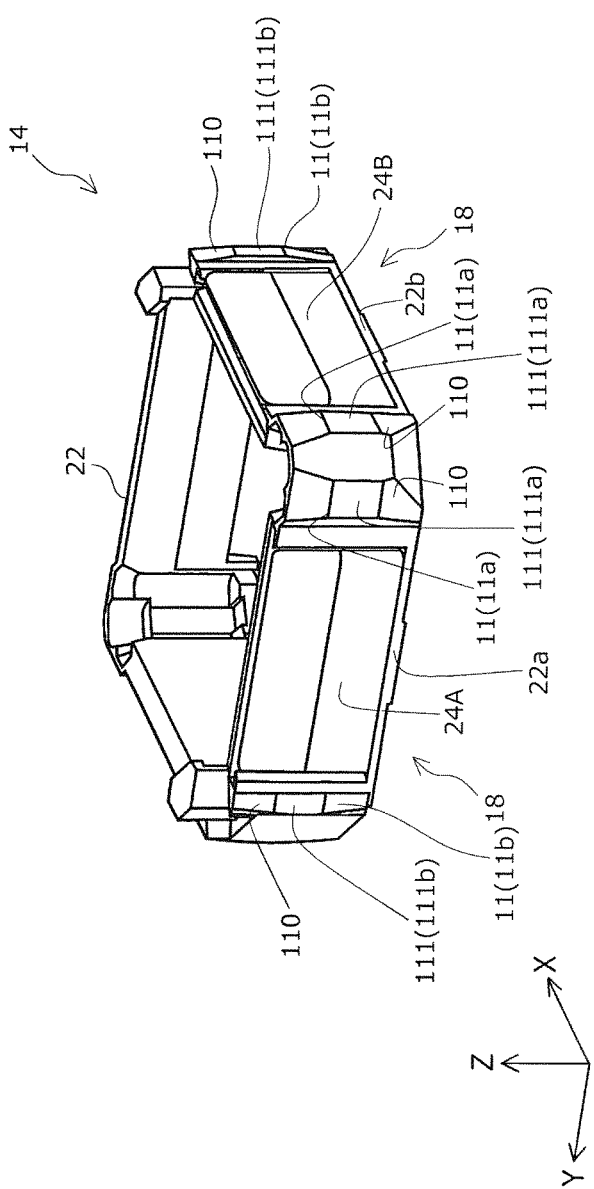
FIG. 6 is a perspective view showing a movable body of an optical unit in accordance with a first embodiment of the present invention.
Figure 7:
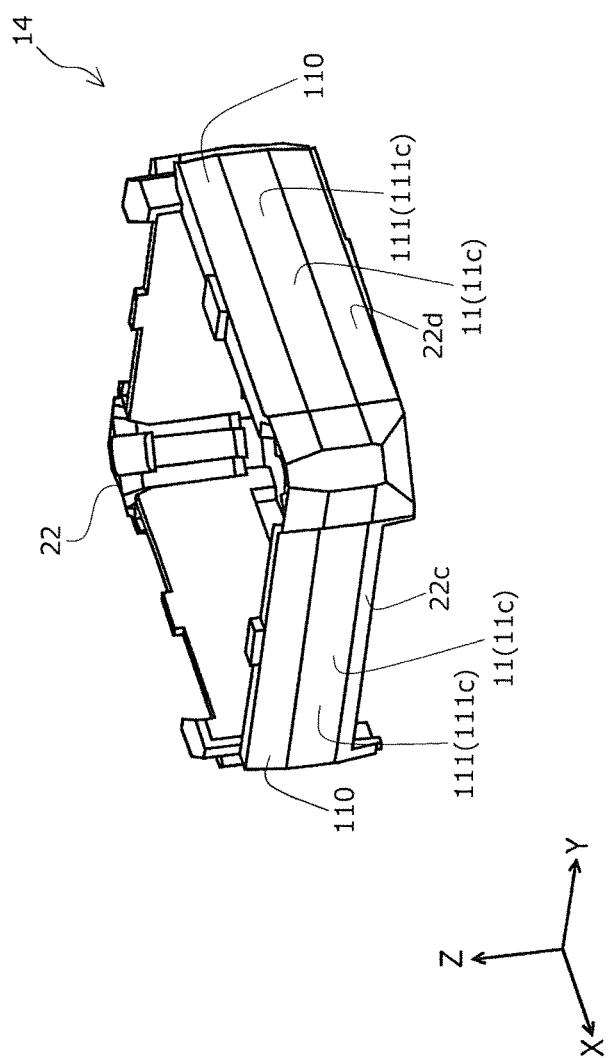
FIG. 7 is a perspective view showing a movable body of an optical unit in accordance with a first embodiment of the present invention which is viewed from an angle different from that in FIG. 6.

As shown in FIG. 6 and FIG. 7, the holder frame 22 of the movable body 14 is formed in a rectangular frame shape. Further, as shown in FIG. 4 and FIG. 5, the side face cover part 28b of the fixed body 16 is provided with a movable body accommodation part 13 in a rectangular shape corresponding to the holder frame 22 formed in a rectangular frame shape. The holder frame 22 in a rectangular frame shape is disposed and accommodated in the rectangular movable body accommodation part 13 so that their four corners are aligned to each other. In this embodiment, the movable body accommodation part 13 is formed larger than the holder frame 22 for allowing a swing of the movable body 14 with respect to the fixed body 16.

As shown in FIG. 6, protruded parts 11 which are protruded toward outer sides (toward directions facing the side face cover part 28b) are formed on both sides of faces 22a and 22b of the holder frame 22 where the magnets 24A and 24B of the turning drive mechanism 18 are attached. Further, as shown in FIG. 7, faces 22c and 22d of the holder frame 22 where the turning drive mechanism 18 is not provided are also formed with protruded parts 11 which are protruded toward outer sides (toward directions facing the side face cover part 28b). Specifically, the faces 22a and 22b of the movable body 14 where the turning drive mechanism 18 is provided are formed with the protruded parts 11a and 11b on both sides of the turning drive mechanism 18, and the faces 22c and 22d are formed with the protruded part 11c on the substantially entire faces 22c and 22d.

Further, as shown in FIG. 4 and FIG. 5, four inner faces 13a on the movable body accommodation part 13 side of the side face cover part 28b are provided with contact parts 15 structured to contact with the protruded part 11 when the movable body 14 is swung with respect to the fixed body 16. Specifically, a contact part 15a to be contacted with the protruded part 11a, a contact part 15b to be contacted with the protruded part 11b, and a contact part 15c to be contacted with the protruded part 11c are provided on the inner faces 13a.

In other words, in the movable body 14 in this embodiment, the protruded parts 11 are formed on all the faces of the movable body 14 intersecting the optical axis direction so as to protrude in a direction that the movable body 14 and the fixed body 16 are faced each other, and all the faces of the fixed body 16 intersecting the optical axis direction are formed with the contact parts 15 which are capable of contacting with the protruded part 11. Further, the faces 22a and 22b of the movable body 14 on which the turning drive mechanism 18 is provided are formed with the protruded parts 11a and 11b on both sides with respect to the turning drive mechanism 18. As described above, in the optical unit 10 in this embodiment, all the faces intersecting the optical axis direction are formed with protruded parts 11 which are protruded in the direction that the movable body 14 and the fixed body 16 are faced each other, and the faces 22a and 22b on which the turning drive mechanism 18 is provided are formed with the protruded parts 11a and 11b on both sides with respect to the turning drive mechanism 18. Therefore, the protruded parts 11 can be efficiently disposed and a movable range of the movable body 14 with respect to the fixed body 16 can be restricted without increasing the size of the optical unit 10. In the movable body 14 in this embodiment, the turning drive mechanism 18 is provided in two faces, but the turning drive mechanism 18 may be provided in three or four faces.

In the optical unit 10 in this embodiment, the protruded parts 11 are formed in the movable body 14 and the contact parts 15 are formed in the fixed body 16. However, the present invention may be structured so that the protruded parts 11 are formed in the fixed body 16 and the contact parts 15 are formed in the movable body 14. However, it is preferable that the protruded parts 11 are formed in the movable body 14 like this embodiment. When the protruded part 11 is formed in the movable body 14, a contact position of the protruded part 11 with the contact part 15 can be restrained from being deviated, and a space between the protruded part 11 and the contact part 15 for securing a desired movable range of the movable body 14 can be minimized. Further, in a case that the protruded part 11 is formed in the fixed body 16, when a position of the movable body 14 deviates from the design center, a contact position of the protruded part may be deviated. However, when the protruded part 11 is formed in the movable body, the contact position can be restrained from deviating.

As shown in FIG. 7, in the optical unit 10 in this embodiment, the protruded part 11c is structured on the faces 22c and 22d of the movable body 14 where the turning drive mechanism 18 is not provided so as to be extended in a direction intersecting the optical axis direction. Therefore, according to the optical unit 10 in this embodiment, the protruded part 11c extended in a direction intersecting the optical axis direction is provided and thus, the rigidity can be increased.

As shown in FIG. 6 and FIG. 7, each of the protruded parts 11 in this embodiment is provided with a tapered part 110 whose length in the optical axis direction is gradually shortened toward the direction that the movable body 14 and the fixed body 16 are faced each other, and an opposing face 111 in a flat face shape provided on a tip end side of the tapered part 110. As described above, it is preferable that the protruded part 11 is provided with the tapered part 110. When the protruded part 11 is formed in a shape having the tapered part 110, the rigidity can be increased.

In this embodiment, in each of the protruded parts 11, the opposing face 111 is structured to contact with the contact part 15. Specifically, the opposing face 111a of the protruded part 11a is structured to contact with the contact part 15a of the contact part 15. Similarly, the opposing face 111b of the protruded part 11b is structured to contact with the contact part 15b of the contact part 15, and the opposing face 111c of the protruded part 11c is structured to contact with the contact part 15c of the contact part 15.

Figure 8:
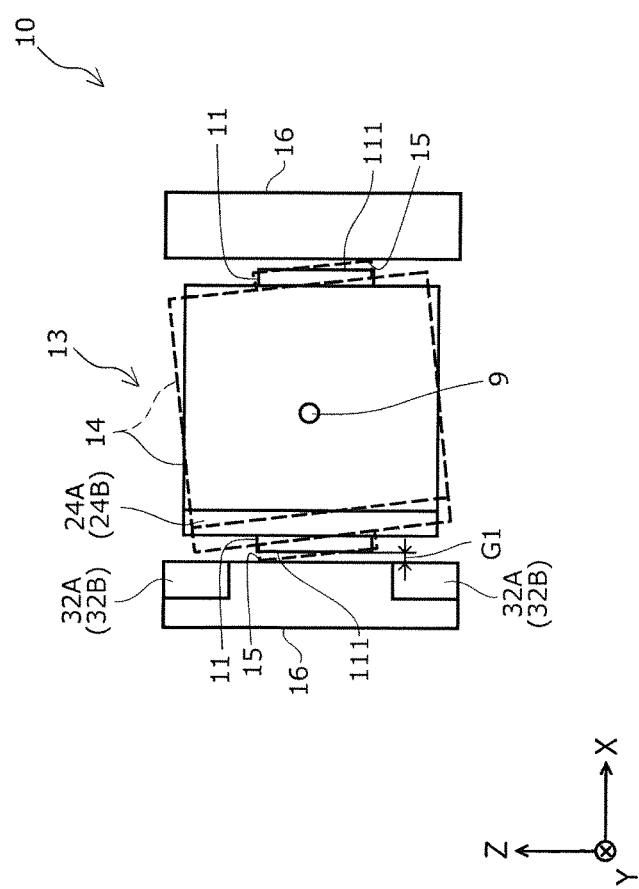
FIG. 8 is a schematic view showing an optical unit in accordance with a first embodiment of the present invention.
Figure 11:
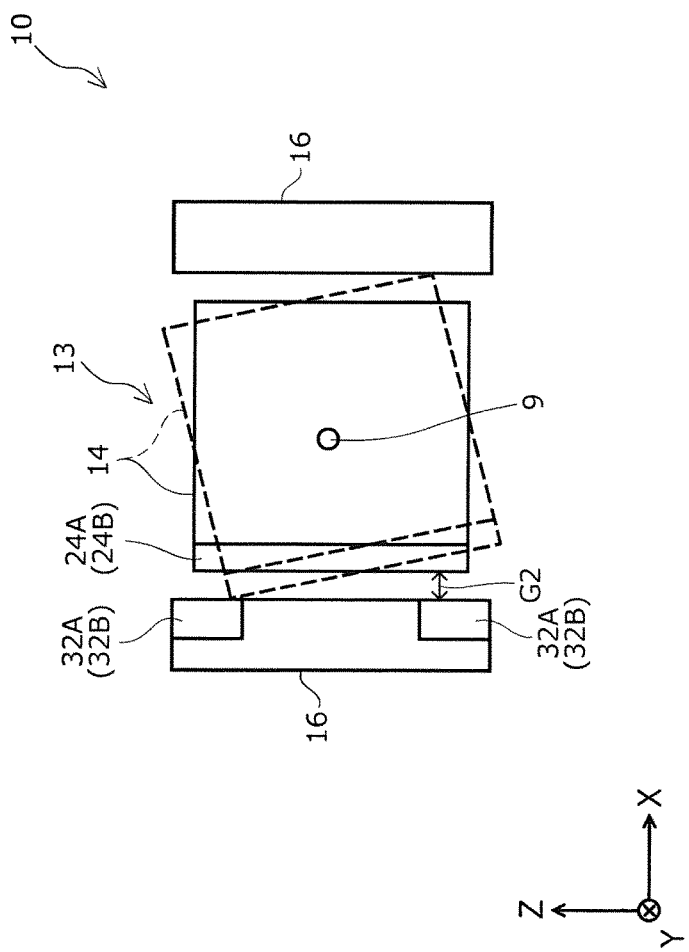
FIG. 11 is a schematic view showing an optical unit in a first comparative example to the present invention.

In the optical unit 10 in this embodiment, a movable range of the movable body 14 with respect to the fixed body 16 and a positional relationship between a swing axis 9 and the opposing face 111 when viewed in a direction intersecting the optical axis direction will be described below with reference to a schematic view showing the optical unit 10 of this embodiment shown in FIG. 8 and a schematic view showing an optical unit 10 in a first comparative example shown in FIG. 11. In FIG. 8 and FIG. 11, the movable body 14 indicated by the solid line shows a state that the movable body 14 is not inclined with respect to the fixed body 16, and the movable body 14 indicated by the broken line shows a state that the movable body 14 is inclined with respect to the fixed body 16 with the swing axis 9 as a reference and the movable body 14 and the fixed body 16 are contacted with each other. FIG. 8 and FIG. 11 are views when the optical unit 10 is viewed in the "Y"-axis direction (axial direction of pitching). These states are similarly applicable to a case that the optical unit 10 is viewed in the "X"-axis direction (axial direction of yawing).

As is clear when comparing FIG. 8 with FIG. 11, in the optical unit 10 in this embodiment shown in FIG. 8, the protruded part 11 is formed in the movable body 14 and thus, a space "G1" between the movable body 14 and the fixed body 16 becomes narrow and a swing range of the movable body 14 with respect to the fixed body 16 is restricted. Therefore, like the movable body 14 as shown by the broken line, even when the movable body 14 is inclined with respect to the fixed body 16 with the swing axis 9 as a reference, the protruded part 11 is contacted with the contact part 15 and thus, contact of the coils 32A and 32B with the magnets 24A and 24B can be restrained. On the other hand, in the optical unit 10 in the first comparative example shown in FIG. 11, the protruded part 11 is not formed in the movable body 14 and thus, a space "G2" between the movable body 14 and the fixed body 16 is wide. Therefore, like the movable body 14 shown by the broken line, when the movable body 14 is inclined with respect to the fixed body 16 with the swing axis 9 as a reference, contact of the coils 32A and 32B with the magnets 24A and 24B may occur.

As described above, in the support mechanism 20 in this embodiment, the movable body 14 can be swingably supported with respect to the fixed body 16 with an axial direction of pitching and an axial direction of yawing which are directions intersecting the optical axis direction as turning axial directions (with the swing axis 9 as a reference). In this case, it is preferable that the protruded part 11 is, as shown in FIG. 8, provided so that the swing axis 9 is located in a range of the opposing face 111 in the optical axis direction. In other words, it is preferable that the protruded part 11 is provided with the opposing face 111 in a flat face shape which is disposed at a position including the swing axis 9 in the optical axis direction so as to face the contact part 15. According to this structure, the opposing face 111 in a flat face shape is disposed at a position including the swing axis 9 in the optical axis direction and thus, a space "G1" between the protruded part 11 and the contact part 15 for securing a desired movable range of the movable body 14 can be minimized.

Further, it is preferable that a length in the optical axis direction of the opposing face 111 is, as shown by the broken line in FIG. 8, set to be a length which does not exceed a position of the swing axis 9 in the optical axis direction when the protruded part 11 and the contact part 15 are contacted with each other. According to this structure, even when the movable body 14 is moved to the maximum with respect to the fixed body 16, a movable range of the movable body 14 with respect to the fixed body 16 can be restricted. In this case, the expression that "a length which does not exceed a position of the swing axis 9 in the optical axis direction when the protruded part 11 and the contact part 15 are contacted with each other" means, for example, a structure that, when an upper end portion of the protruded part 11 on a left side in FIG. 8 is contacted with the contact part 15, the upper end portion of the protruded part 11 does not reach a lower side with respect to the swing axis 9 and, similarly, when a lower end portion of the protruded part 11 on a right side in FIG. 8 is contacted with the contact part 15, the lower end portion of the protruded part 11 does not reach an upper side with respect to the swing axis 9.

Figure 9:
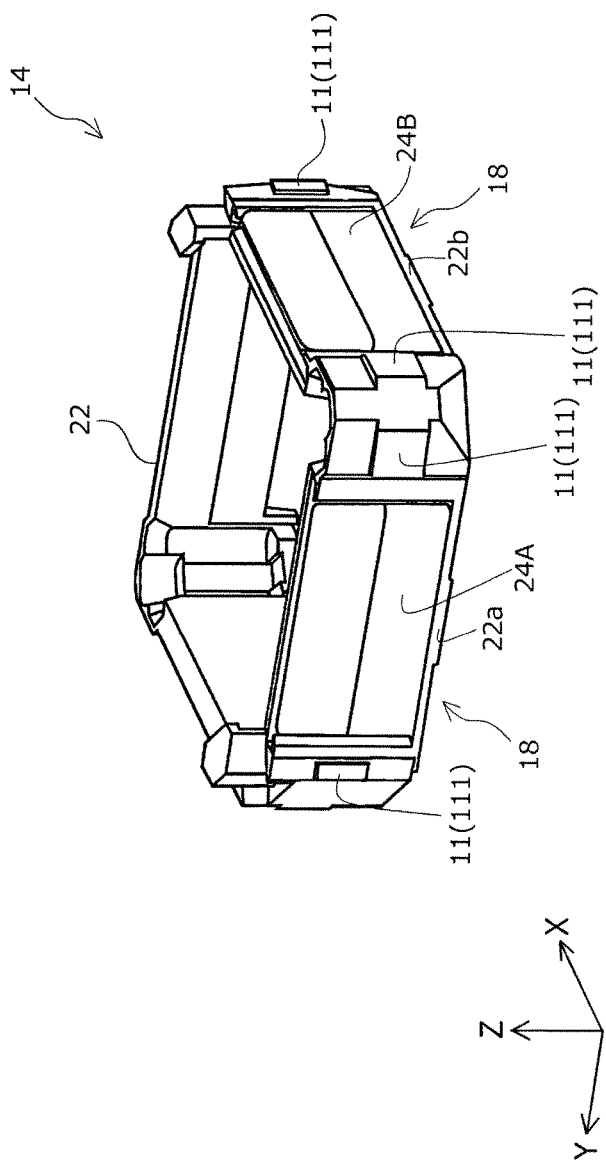
FIG. 9 is a perspective view showing a movable body of an optical unit in accordance with a second embodiment of the present invention.

Second Embodiment (FIG. 9)

Next, an optical unit 10 in a second embodiment will be described below with reference to FIG. 9. FIG. 9 is a perspective view showing a movable body 14 of an optical unit 10 in a second embodiment and is a view corresponding to FIG. 6 in the optical unit 10 in the first embodiment. Structure members common to the first embodiment are indicated with the same reference signs and their detailed descriptions are omitted. The optical unit 10 in the second embodiment has the same structure as the optical unit 10 in the first embodiment except a structure of the movable body 14.

As described above, in the optical unit 10 in the first embodiment, the tapered part 110 is formed in the protruded part 11. On the other hand, in the optical unit 10 in the second embodiment, as shown in FIG. 9, the protruded part 11 does not have a tapered shape. Each of the protruded part 11 in the second embodiment is protruded to a direction perpendicular to the optical axis direction and is formed with an opposing face 111 in a flat face shape for contacting with the contact part 15 at its tip end part.

Figure 10:
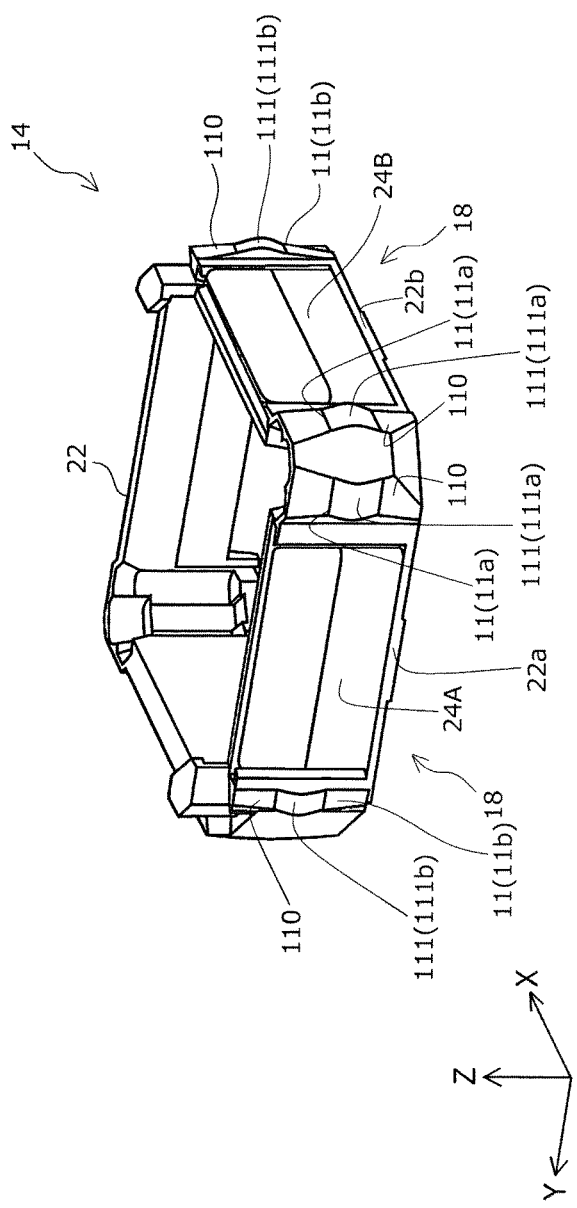
FIG. 10 is a perspective view showing a movable body of an optical unit in accordance with a third embodiment of the present invention.

Third Embodiment (FIG. 10)

Next, an optical unit 10 in a third embodiment will be described below with reference to FIG. 10. FIG. 10 is a perspective view showing a movable body 14 of an optical unit 10 in a third embodiment and is a view corresponding to FIG. 6 in the optical unit 10 in the first embodiment. Structure members common to the first and the second embodiments are indicated with the same reference signs and their detailed descriptions are omitted. The optical unit 10 in the third embodiment has the same structure as the optical unit 10 in the first embodiment except a structure of the movable body 14.

As described above, in the optical units 10 in the first and the second embodiments, the opposing face 111 in a flat face shape is formed in the protruded part 11. On the other hand, in the optical unit 10 in the third embodiment, the protruded part 11 is formed with an opposing face 111 in a curved surface shape. Specifically, a support mechanism 20 in this embodiment is structured so that the movable body 14 is swingably supported with respect to the fixed body 16 with the swing axis 9 in a direction intersecting the optical axis direction as a reference, and the protruded part 11 is provided with an opposing face 111 which is a circular arc face with the swing axis 9 as a center. Since the protruded part 11 is provided with a circular arc face with the swing axis 9 as a center, a movable range of the movable body 14 can be restricted regardless of its swing angle. In this case, the phrase "circular arc face" means either of a spherical surface in a ball shape and a circular peripheral face in a cylindrical shape.

Although the present invention has been shown and described with reference to a specific embodiment, various changes and modifications will be apparent to those skilled in the art from the teachings herein.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit comprising:
a movable body comprising an optical module;
a fixed body;
a support mechanism structured to swingably support the movable body with respect to the fixed body; and
a magnetic drive part which is provided on at least two faces of the movable body and the fixed body facing in a direction intersecting an optical axis direction and is structured to swing the movable body with respect to the fixed body;
wherein all faces of one of the movable body and the fixed body in the direction intersecting the optical axis direction are formed with a protruded part which is protruded to a direction where the movable body and the fixed body are faced each other;
wherein all faces of an other of the movable body and the fixed body in the direction intersecting the optical axis direction are formed with a contact part which is capable of contacting with the protruded part; and
wherein the face of the one of the movable body and the fixed body where the magnetic drive part is provided is formed with the protruded part on both sides of the magnetic drive part.

2. The optical unit according to claim 1, wherein a face of the one of the movable body and the fixed body where the magnetic drive part is not provided is formed with the protruded part which is extended in a direction intersecting the optical axis direction.

3. The optical unit according to claim 1, wherein the protruded part is formed in the movable body.

4. The optical unit according to claim 1, wherein
the support mechanism swingably supports the movable body with respect to the fixed body with a swing axis in a direction intersecting the optical axis direction as a reference, and
the protruded part comprises an opposing face in a flat face shape which is disposed in a direction facing the contact part at a position including the swing axis in the optical axis direction.

5. The optical unit according to claim 4, wherein a length in the optical axis direction of the opposing face is set to be a length which does not exceed a position of the swing axis in the optical axis direction when the protruded part and the contact part are contacted with each other.

6. The optical unit according to claim 1, wherein
the support mechanism swingably supports the movable body with respect to the fixed body with a swing axis in a direction intersecting the optical axis direction as a reference, and
the protruded part comprises a circular arc face with the swing axis as a center.

7. The optical unit according to claim 1, wherein the protruded part comprises a tapered part whose length in the optical axis direction is gradually reduced toward the direction in which the movable body and the fixed body are faced each other.

* * * * *